June 7, 1960 E. V. KOSKELA 2,939,659
ADJUSTABLE SUPPORT FOR FILM STRIP AND SLIDE PROJECTOR
Original Filed July 17, 1952 3 Sheets-Sheet 1

INVENTOR.
Elmer V. Koskela
BY
Mason, Kolehmainen, Rathburn and Wyss
Attorneys

INVENTOR.
Elmer V. Koskela
BY
ATTORNEYS.

June 7, 1960 E. V. KOSKELA 2,939,659
ADJUSTABLE SUPPORT FOR FILM STRIP AND SLIDE PROJECTOR
Original Filed July 17, 1952 3 Sheets-Sheet 3
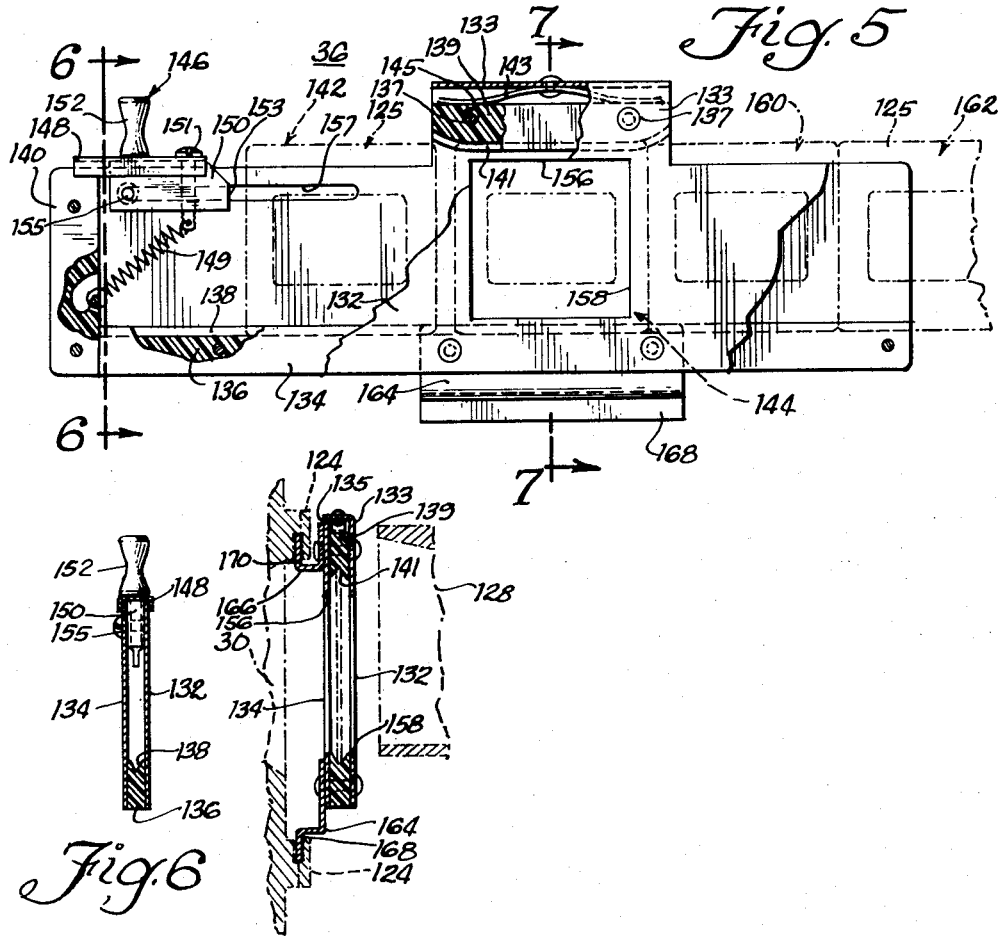
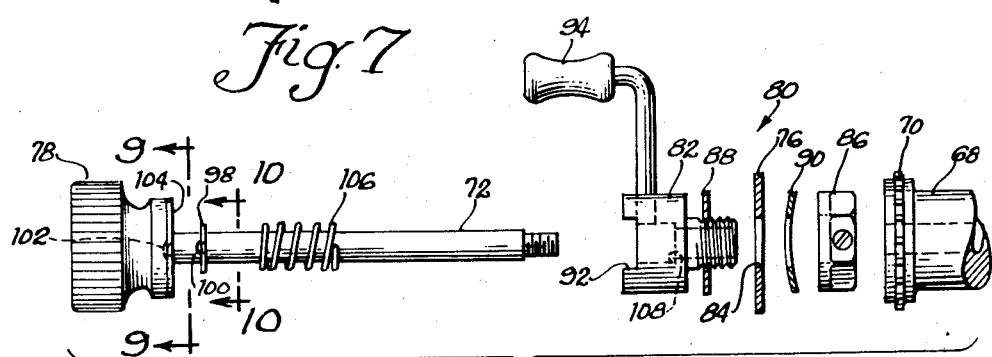
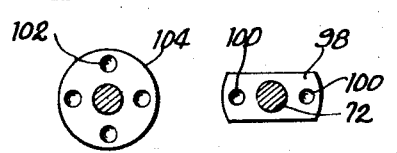
INVENTOR.
Elmer V. Koskela
BY
Mason, Kolehmainen, Rathburn and Wyss
Attorneys

2,939,659

ADJUSTABLE SUPPORT FOR FILM STRIP AND SLIDE PROJECTOR

Elmer V. Koskela, 1525 N. Elston Ave., Chicago 22, Ill.

Original application July 17, 1952, Ser. No. 299,424. Divided and this application Sept. 27, 1956, Ser. No. 612,414

2 Claims. (Cl. 248—11)

This invention relates to a film projector and, more particularly to a projector including adjustable supporting means. The present application is a division of a copending application of Elmer V. Koskela, Serial No. 299,424, filed July 17, 1952, now Patent No. 2,793,563.

Although prior projectors are available for projecting either strip film or mounted film slides, it is often too expensive to obtain machines for use with each type of film. It is particularly desirable to have a single machine capable of utilizing both types of film, since material such as educational data is often available only on either one or the other of the two types of film. Also, film projectors normally utilized in the home or in educational institutions are operated by unskilled personnel so that both conversion from one type of film feeding device to the other and the operation of each of the feeding devices must be simple and easily accomplished.

The object is to provide a film projector in which the projecting apparatus is capable of being automatically adjusted to a desired position for projection.

In accordance with this and many other objects, one embodiment of the invention comprises a film projector including a base member on which is pivotally mounted a supporting plate carrying a housing and a focus lens support. The housing is provided with means for supporting either a strip film feeding means or a film slide feeding means in a position interposed between a light source enclosed within the housing and a focusing lens slideably carried by the focus lens support. The film strip feeding means includes a unitary lens positioning and masking device detachably mounted thereon, and a film advancing means which is adapted to be actuated either by manual rotation of a knob carried on the device or by means of a remote control actuating means. The film slide feeding means includes a U-shaped trough having a V-shaped supporting surface and within which a slideably mounted element is manually moved to position slides in a position interposed between the light source and the focusing lens. This manually actuated feeding element is automatically returned to a loading position under the control of a spring interconnecting the feeding element with the U-shaped member.

The focus lens support of the projector is formed of a single integral casting, and is provided with a centrally apertured portion to slideably receive an adjustable focusing lens actuated by a concave rubber covered driving cylinder, and is also provided with a recessed upper portion adapted to receive and support therein, in alignment with the strip feeding device, a roll of film. The housing member is formed with a plurality of integral inclined slats in an upper wall thereof both to permit convectional currents of cooling air and to prevent glare from the enclosed source of light from reaching the eyes of the projector operator. The supporting plate, which is pivotally mounted to the base member, is provided with a spring loaded cam member which is controlled by threaded means carried by the base in order to adjustably position the projecting apparatus at a predetermined angle of inclination relative to the base member.

Other objects and advantages of the present invention will become apparent from the ensuing description of an illustrative embodiment thereof in the course of which reference is had to the accompanying drawings in which.

Figure 1:
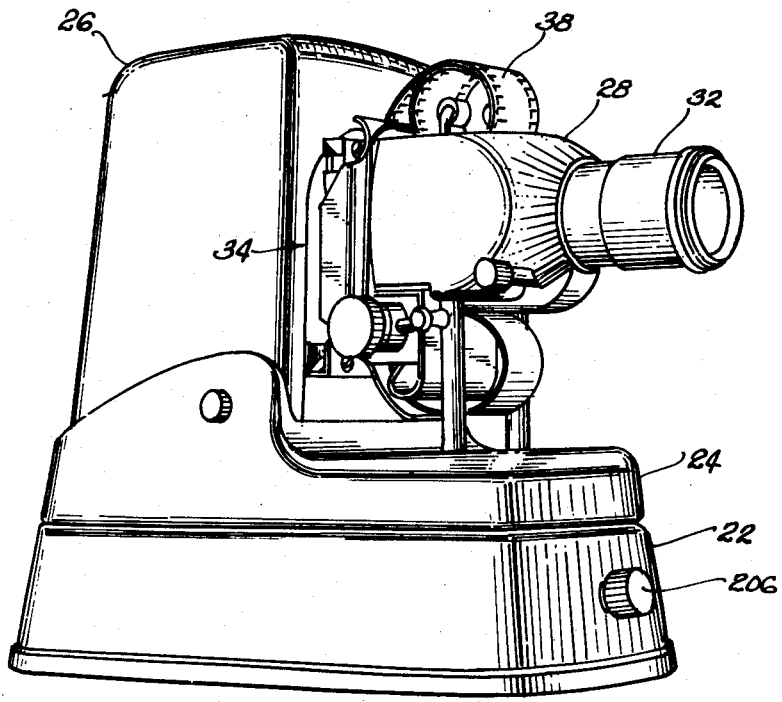
Fig. 1 is a perspective view of a film projector embodying the invention.

Referring now to the drawings, there is shown a film projector, indicated generally as 20, which includes a base portion 22 to which is pivotally secured a table 24 having a housing 26 and a focus lens support 28 mounted thereon. The housing 26 encloses a source of light and supports a collimating lens 30 for focusing this light to impinge upon a film 38 moved between the housing 26 and the focus lens support 28.

The focus lens support 28 includes an adjustable focusing lens assembly 32 positioned in alignment with the collimating lens 30. Either a film strip feeding device, indicated generally as 34, or a film slide feeding device is mounted on the housing 26 in a position interposed between this housing and the focusing lens 32 carried by the support 28. The construction of the projection apparatus and of the film feeding means is shown and described in detail in the above identified Koskela patent.

To provide a pivotal mounting for the table 24 to permit vertical adjustment of the beam provided by the focusing lens 32, the supporting table 24 is threadedly engaged by a pair of spaced machine bolts 190, only one of which is shown in the drawings. A coil spring 192 is interposed between a lower surface of the upper wall of the base 22 and the head of each of the machine bolts 190 so as to resiliently urge these bolts in a downward direction and, accordingly, to urge the lower edge of the supporting table 24 into engagement with the base 22. However, the provision of the coil spring 192 also permits the supporting table 24 and bolts 190 carried thereby to pivot relative to the base 22.

In order to automatically control and produce a predetermined amount of inclination of the supporting table 24 relative to the base 22, a slightly offset bolt or shaft 194, depending from the table 24, is provided with a cam surface 196. A sleeve 198 is secured to and depends from an upper wall of the base 22 and receives the lower end of the offset bolt 194. A coil spring 200 is positioned between a lower surface of the top wall of the table 24 and the upper surface of the top wall of the base 22, and resiliently urges the table 24 in an upward direction relative to the base 22. A collar 202 is interposed between the coil spring 200 and the offset shaft 194 and serves to maintain spring 200 in a position concentric with the shaft 194.

Figure 2:
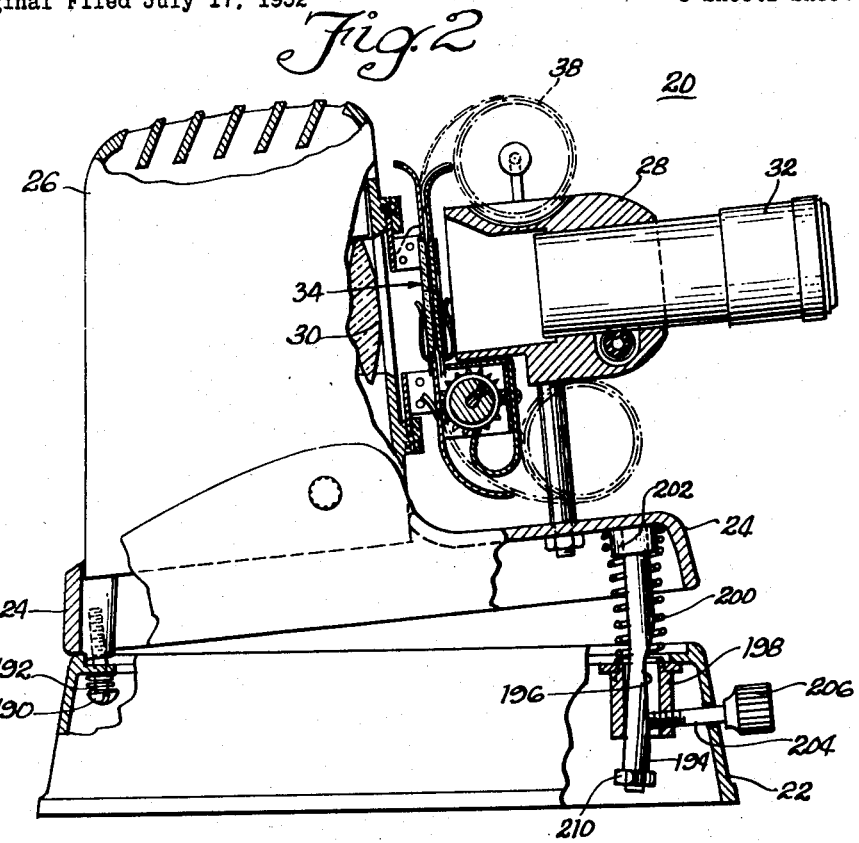
Fig. 2 is a side elevational view, in partial section, of the projector shown in Fig. 1.

In order to control the relative positions of the table 24 and the base 22, a threaded member 204, having a knob 206 thereon, is threadedly engaged within the sleeve 198 with one end of the member 204 in engagement with the cam surface 196. As the member 204 is rotated in a counterclockwise direction to move to the right, as viewed in Fig. 2 of the drawings, the offset shaft 194 and the table 24 are permitted to move in a counterclockwise direction under the resilient action of the coil spring 200. When a predetermined position is reached, the threaded member 204 is rotated in a clockwise direction to force the offset shaft 194 into engagement with the lower edge of the sleeve 198, and to clamp this member in a predetermined position.

When it is desired to return the supporting table to a normal horizontal position, the threaded member 204 is rotated in a counterclockwise direction to release the shaft 194 from engagement with the sleeve 198, and the table 24 is manually depressed against the action of the spring 200. When the table 24 is positioned in the desired horizontal position, the threaded member 204 may be rotated in a clockwise direction to engage the cam surface 196 and clamp the table 24 in this position. A subsequent counterclockwise rotation of the threaded means 204 once again permits the shaft 194 to move upward, under the action of the spring 200, by producing a sliding engagement between the end of the threaded member 204 and the cam surface 196.

Therefore, the cam surface 196 and threaded member 204 cooperate to provide a fine control over the inclination of the projecting apparatus and also provide a means for positively securing the supporting table 24 in a desired position relative to the base 22. A nut 210 secured to the lower end of the shaft 194 engages the lower edge of the sleeve 198 and thereby limits the allowable amount of deflection of the supporting table 24 relative to the base 22.

While the present invention has been described in connection with the details of an illustrative embodiment, it should be understood that these details are not intended to be limitative of the invention except in so far as set forth in the accompanying claims.

What is claimed as new and desired to be secured by Letters Patent of the United States is:

1. In a projector, a base, projector supporting means pivotally mounted on the base, a sleeve depending from the base, cam means depending from the supporting means and extending into the sleeve, a coil spring positioned around the cam means and interposed between the base and the supporting means for urging the supporting means away from the base, threaded means carried by the sleeve and in engagement with the cam means for controlling the movement of the supporting means relative to the base, said threaded means being movable to force the cam means into engagement with the sleeve to lock the supporting means in a desired position, and means carried by the cam means and movable into engagement with the sleeve to limit the movement of the supporting means relative to the base.

2. In a projector, a base, projector supporting means pivotally mounted on the base, cam means having a smooth cam surface depending from said supporting means in a direction toward said base, spring means interposed between said base and said supporting means urging said supporting means away from said base, and adjustable means threadedly secured to said base and including a portion engaging said smooth cam surface, said smooth cam surface having such a contour that the mere application of a force on said supporting means in a direction toward said base causes movement thereof toward said base against the force of said spring means regardless of the adjustment of said adjustable means, movement of said projecting means away from said base under the influence of said spring means being controlled solely by adjustment of said adjustable means.

References Cited in the file of this patent

UNITED STATES PATENTS

| | | |
|---|---|---|
| 1,035,872 | Goodrich | Aug. 20, 1912 |
| 2,463,026 | Field | Mar. 1, 1949 |
| 2,534,731 | Perillo | Dec. 19, 1950 |
| 2,534,732 | Perillo | Dec. 19, 1950 |
| 2,543,967 | Heyer | Mar. 6, 1951 |
| 2,696,961 | Fox | Dec. 14, 1954 |

UNITED STATES PATENT OFFICE

CERTIFICATE OF CORRECTION

Patent No. 2,939,659            June 7, 1960

Elmer V. Koskela

It is hereby certified that error appears in the above numbered patent requiring correction and that the said Letters Patent should read as corrected below.

In the drawings, the present "Sheet 3, comprising Figs. 5, 6, 7, 8, 9 and 10", should be canceled; in the heading to Sheet 1, line 3, for "3 Sheets-Sheet 1" read -- 2 Sheets-Sheet 1 --; and in the heading to Sheet 2, line 3, for "3 Sheets-Sheet 2" read -- 2 Sheets-Sheet 2 --.

Signed and sealed this 20th day of December 1960.

(SEAL)
Attest:

KARL H. AXLINE
Attesting Officer

ROBERT C. WATSON
Commissioner of Patents